E. HINTZ AND H. SCHULZ.
METHOD OF DRYING PATENT LEATHER.
APPLICATION FILED FEB. 5, 1918.
1,346,091.
Patented July 6, 1920.
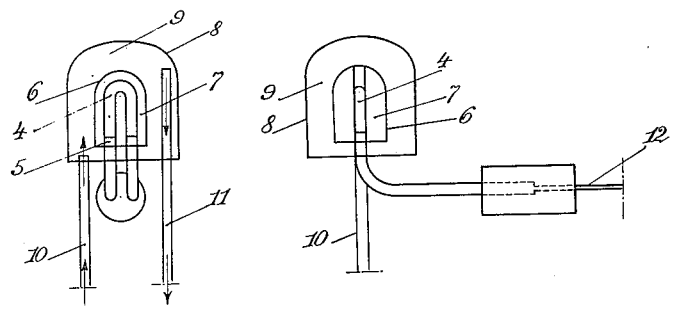
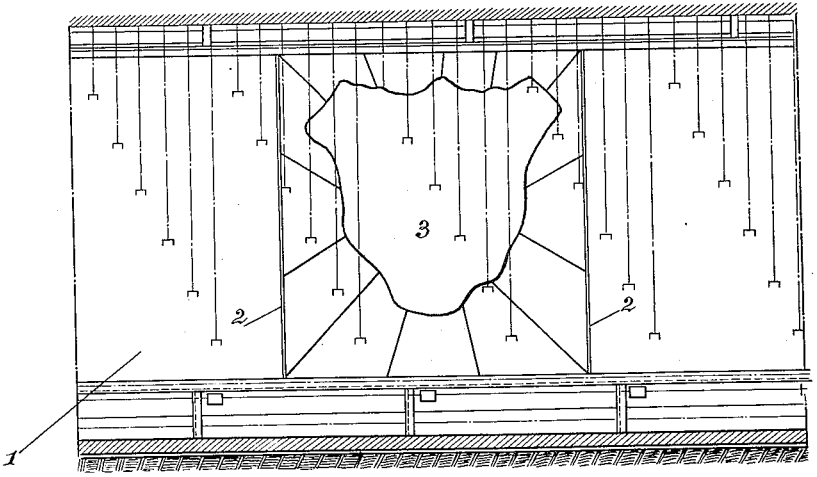
Inventors:
Ernst Hintz and Heinrich Schulz
By [signature]
Attorney.

UNITED STATES PATENT OFFICE.

ERNST HINTZ, OF WIESBADEN, AND HEINRICH SCHULZ, OF WORMS, GERMANY.

METHOD OF DRYING PATENT-LEATHER.

1,346,091.   Specification of Letters Patent.   Patented July 6, 1920.

Application filed February 5, 1918. Serial No. 215,554.

*To all whom it may concern:*

Be it known that we, (1) ERNST HINTZ, chemist, and (2) HEINRICH SCHULZ, chemist, subjects of the German Emperor, residing at (1) Nerobergstrasse No. 24, Wiesbaden, Germany, and (2) Alzeyerstrasse No. 57, Worms, Germany, have invented certain new and useful Improvements in Methods of Drying Patent-Leather, of which the following is a specification.

It is known that in drying patent leather by means of ultraviolet rays the generation of ozone is a detrimental feature of the process, as the presence of such ozone will greatly impair the favorable properties of the ultraviolet rays for drying said patent leather. For obviating this drawback, measures have been taken, the object of which was to render the ozone produced ineffective by diluting the same, or by counteracting its production as far as possible. It was also proposed to prevent the production of ozone during the exposure to the ultraviolet rays by such exposure being carried out in an inert gas, all atmospheric air being excluded. Both measures fail to secure the full result desired. The present invention aims to overcome the objectionable feature above indicated, and is based on the scientifically ascertained fact that ozone is produced only by the atmospheric oxygen absorbing the shortwaved ultraviolet rays, and that the said absorption entirely ceases with rays of a wave length of over 200 micromillimeters. According to the invention, this scientific principle is applied to the drying of patent leather in the following manner: The source of light employed for treating the leather is fitted with a screen which will absorb rays from a little above 200 micromillimeters wave length downward, and will not let any rays of shorter wave lengths pass through. By such means it is possible to prevent the production of ozone entirely by means of the source of light itself. Owing to the simplicity and reliability of this method its importance for drying patent leather is extremely great.

A source of light according to the present invention may be obtained by fitting a quartz-mercury lamp or some other suitable source of light with a screen or filter which has the hereinbefore specified property and which may be composed either of solid matter, or of liquids or of a combination of both. Solid matter which may be used for such purpose may comprise, for example, limespar, uviolglass and the like; as examples of liquids which may be used, water and glycerin, and mixtures thereof, may be mentioned; and mercury vapor may be given as an example of a suitable gas. In all instances either the source of light should contain no oxygen-producing rays, and, therefore, no rays that are absorbed by the oxygen of the atmospheric air, or else the filters must comply with the condition that they will by no means let any rays of light of a wave length of less than 200 micromillimeters pass through.

The accompanying drawing shows one form of apparatus in which the improved process may be carried out, Figure 1 being a partial longitudinal section through the drying chamber, and Figs. 2 and 3 being, respectively, a front elevation and a side elevation of the quartz lamp.

Referring more particularly to the drawing, 1 indicates a chamber of relatively great length, but of small width, in which the leather 3, stretched on the frame 2 in the usual way, is subjected to the action of the light in accordance with the invention. The sources of light, which may be distributed throughout the drying chamber, as indicated diagrammatically in Fig. 1, may consist, as shown for example in Figs. 2 and 3, of quartz lamps, each comprising an evacuated glow tube 4 of quartz, which is partially filled with mercury 5. Said tube is surrounded by an inner quartz jacket 6, there being between it and the tube 4 an evacuated space 7. The jacket 6 is surrounded, in turn, by an outer jacket 8, which may also be made of quartz or of other material which permits the passage of light for a certain portion of the spectrum, a suitable space 9 being left between the two jackets which is filled with the absorbent liquid or gaseous medium constituting the screen or filter above referred to. Said medium is admitted through the pipe 10 and drawn off through the pipe 11, and the current is fed in the ordinary way through the conductors 12.

We claim:

1. The method of drying patent leather, which consists in subjecting it to the action of ultraviolet rays all above a minimum wave length of 200 micromillimeters; substantially as described.

2. The method of drying patent leather, which consists in exposing it to the action of light rich in ultra-violet rays, and interposing between the source of light and the leather a filter capable of absorbing all light rays below a minimum wave length of 200 micromillimeters; substantially as described.

In testimony whereof we affix our signatures.

ERNST HINTZ.
HEINRICH SCHULZ.